(12) United States Patent
Saito et al.

(10) Patent No.: US 6,807,573 B2
(45) Date of Patent: *Oct. 19, 2004

(54) SCHEME FOR MANAGING NODES CONNECTED TO A HOME NETWORK ACCORDING TO THEIR PHYSICAL LOCATIONS

(75) Inventors: Takeshi Saito, Tokyo (JP); Hajime Ohsawa, Tokyo (JP); Shigeru Maeda, Tokyo (JP); Tatsunori Kanai, Kanagawa (JP); Shigeyasu Natsubori, Kanagawa (JP); Toshio Okamoto, Tokyo (JP); Yoshiaki Takabatake, Kanagawa (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/243,661

(22) Filed: Sep. 16, 2002

(65) Prior Publication Data

US 2003/0018757 A1 Jan. 23, 2003

Related U.S. Application Data

(62) Division of application No. 09/153,892, filed on Sep. 16, 1998, now Pat. No. 6,480,889.

(30) Foreign Application Priority Data

Sep. 16, 1997 (JP) .......................................... P09-250494

(51) Int. Cl.7 .............................................. G06F 15/00
(52) U.S. Cl. ........................ 709/220; 709/223; 707/100
(58) Field of Search .......................... 707/100; 709/220, 709/223, 229, 230; 713/166; 705/1; 725/9–12

(56) References Cited

U.S. PATENT DOCUMENTS 5,202,985 A * 4/1993 Goyal ............................ 707/4
5,774,689 A * 6/1998 Curtis et al. ................... 703/21
5,913,218 A * 6/1999 Carney et al. .............. 707/200

FOREIGN PATENT DOCUMENTS

| JP | 2-122794 | 5/1990 |
| JP | 5-276184 | 10/1993 |
| JP | 7-235947 | 9/1995 |
| JP | 2506387 | 8/1996 |

* cited by examiner

Primary Examiner—Greta Robinson
Assistant Examiner—Cheryl Lewis
(74) Attorney, Agent, or Firm—Oblon, Spivak, McClelland, Maier & Neustadt, P.C.

(57) ABSTRACT

A scheme for managing nodes connected to a home network according to their physical location is disclosed. A communication device constituting each node is formed by at least one communication unit for carrying out communications through a connected network, having communication ports for connecting nodes through which data are to be exchanged by the nodes, and a configuration information memory unit for storing a configuration information regarding a configuration of the communication device, having a region for dynamically describing a location information regarding a physical location of the communication device. At a managing node, a configuration information of a connected network and a location information regarding a physical location of a prescribed node connected to the network are collected, and physical locations of other nodes/services that are connected to the prescribed node are managed by regarding the other nodes/services as existing at an identical physical location as the physical location of the prescribed node as specified by the location information.

3 Claims, 12 Drawing Sheets

SCHEME FOR MANAGING NODES CONNECTED TO A HOME NETWORK ACCORDING TO THEIR PHYSICAL LOCATIONS

CROSS-REFERENCE TO RELATED APPLICATIONS

The present application is a divisional of parent U.S. application Ser. No. 09/153,892 filed Sep. 16, 1998, U.S. Pat. No. 6,480,889 B1, the entire contents of which are hereby incorporated herein by reference.

BACKGROUND OF THE INVENTION

1. Field of the Invention

The present invention relates to a scheme for managing a network utilizing information outlets in a home network environment.

2. Description of the Background Art

In recent years, there is a rapid trend for digitalizing electronic devices as exemplified by advances of the multi-media technology, and this trend is already noticeable in the office environment.

In terms of hardware, this trend has been materialized in forms of introduction of PCs, digitalization of OA devices and formation of networks among them. Also, in terms of software, this trend has been expanding to cover the basic functions of hosts (which are progressively light-sized and transferred to PCs), the application software such as the word-processing software, the spreadsheet software, etc., and the Internet application such as the WWW.

The similar trend can also be seen in the home environment for home use devices and related fields. Namely, even in the home environment, this trend for digitalization has been steadily progressed in forms of digitalization of AV devices (DVD, digital VTR, digital video camera, etc.), digitalization of broadcasting, and Internet access such as OCN.

This trend of technological innovations that has started from the office environment is expected to progress toward the formation of networks in future. Namely, it is expected that the technologies of various fields such as information processing, communication and broadcasting will be unified by the digitalization, and inter-mixed with each other by the formation of networks.

There are many candidates for the network technologies that provide the bases for this trend. For example, the Ethernet has overwhelming records of the actual use in the office environment and is probably the most promising candidate even for the home PC network. Also, the ATM is another serious contender because of the general consensus among the infra-structure constructors (telephone companies, CATV companies, etc.) to keep constructing the infra-structures based on this technology in view of the advantageous characteristics of the ATM such as its fast, real-time, and wide bandwidth properties.

In addition to these candidates, the network technology (bus technology) called IEEE 1394 has been attracting much attention recently. This IEEE 1394 has several remarkable characteristics such as its fast, real-time (QOS guaranteed), and plug-and-play properties, so that there is a high expectation especially among the AV industries on the IEEE 1394 as the most promising candidate for a future scheme for inter-connecting digital AV devices. This vogue has also instigated much interest to the IEEE 1394 from the computer industries as well.

In the initial phase, it is expected that the inter-connection of the home use digital devices by these various network technologies will be realized in conjunction with the spread of the home use digital devices, depending on preferences and demands of the users, and in this way prototype digital networks will be gradually built up inside each home. When these digital networks become more widespread, it is conceivable that a home will come to be equipped with "information outlets" in the similar manner as the electric outlets commonly found in our homes today.

Namely, similarly as the currently used electric outlets, dedicated outlets for the purpose of making connections to the home network will be provided at each room or any other convenient location within a home. These information outlets are inter-connected either directly or via bridges behind the wall, for example, so as to provide an infrastructure capable of easily realizing things like "AV data transfer from this room to that room".

In the IEEE 1394 mentioned above, in order to realize such information outlets, the so called "long haul 1394" which is capable of ensuring a cable length of over 50 meters is currently under the discussion, and its use in realization of the domestic information outlets will be quite promising.

Now, in the current network management, the network configuration information (such as an information regarding a node that exists in the network or an information regarding a service that is provided in the network, for example) is discriminated according to MAC address, IP address, host name (domain name) or the like that is assigned to each node, and displayed on a screen of the network management terminal and the like. In general, the network manager is an expert in the network art so that he basically encounters no difficulty in a situation like that.

However, in the home network, actual nodes will be the home use devices such as TV, VTR and camera, and it is quite difficult to expect a general home use device user to be capable of handling such a node management and a network management that requires the naming of these nodes by domain names or even worse discriminating these nodes according to MAC addresses.

What seems the most simple and convenient way of doing the same in the home network is to relate locations and devices, as in "the TV on the second floor", "the DVD in the reception room", and so on. This way is intuitively easy to comprehend speaking from our everyday life experiences.

However, it has been difficult to realize this because of the following problem. Namely, in the link layer network technologies most notably represented by IEEE 1394 and Ethernet, there is a concept of node "connection" but there is not a concept of node "location". Namely, it is possible to recognize things like "this node is connected to the network" or "the node A is connected next to the node B", but there has been simply no way of recognizing a physical location at which the node is actually located in such a manner as "this node is located in the reception room".

SUMMARY OF THE INVENTION

It is therefore an object of the present invention to provide a scheme for managing nodes connected to a home network according to their physical location.

Specifically, the present invention provides a communication device, a network information management method, and a location information notification method that can be used in realizing such a network node management scheme.

According to one aspect of the present invention there is provided a communication device, comprising: at least one communication unit for carrying out communications through a connected network, having communication ports for connecting nodes through which data are to be exchanged by the nodes; and a configuration information memory unit for storing a configuration information regarding a configuration of the communication device, having a region for dynamically describing a location information regarding a physical location of the communication device.

In this aspect of the present invention, it becomes possible to enable the other communication device to recognize a physical location (such as living room, children's room, etc.) at which this communication device is located, through the configuration information memory unit such as a configuration memory. In particular, it is quite useful in the case of identifying a physical location of a communication device which can be regarded as not moving in general, such as an information outlet embedded in the wall.

According to another aspect of the present invention there is provided a communication device, comprising: a plurality of communication units for carrying out communications through a connected network, each communication unit having communication ports for connecting nodes through which data are to be exchanged by the nodes; and a configuration information memory unit for storing a configuration information regarding a configuration of the communication device, having a region for dynamically describing a location information regarding a physical location of each communication unit.

In this aspect of the present invention, it becomes possible to enable the other communication device to recognize a physical location at which each communication unit is located, through the configuration information memory unit such as a configuration memory.

According to another aspect of the present invention there is provided a communication device, comprising: at least one communication unit for carrying out communications through a connected network, having communication ports for connecting nodes through which data are to be exchanged by the nodes; and a configuration information memory unit for storing a configuration information regarding a configuration of the communication device, having a region for describing an information regarding whether the communication device is movable or immovable.

In this aspect of the present invention, it becomes possible to enable the other communication device to recognize whether this communication is movable or immovable, through the configuration information memory unit such as a configuration memory. In particular, in the case of identifying a physical location of a communication device which can be regarded as not moving in general, such as an information outlet embedded in the wall, a node connected to that information outlet located at the identified physical location can be regarded as being located at the same physical location (the same room, for example) as that information outlet in general. This can also be asserted from the fact that in general a length of a network cable (for example, a length of an electricity cable of the IEEE 1394) is short (4.5 m).

According to another aspect of the present invention there is provided a communication device, comprising: at least one communication unit for carrying out communications through a connected network, having communication ports for connecting nodes through which data are to be exchanged by the nodes; and a configuration information memory unit for storing a configuration information regarding a configuration of the communication device, having a region for describing an information indicating a communication port which is a leaf of a network structure among the communication ports.

In this aspect of the present invention, it becomes possible to enable the other communication device to recognize which communication port of this communication device corresponds to a leaf, through the configuration information memory unit such as a configuration memory. In particular, in the case of identifying a physical location of a communication device which can be regarded as not moving in general, such as an information outlet embedded in the wall, a node connected to a leaf of that information outlet located at the identified physical location can be regarded as being located at the same physical location (the same room, for example) as that information outlet.

According to another aspect of the present invention there is provided a communication device, comprising: a configuration information collection unit for collecting a configuration information of a connected network; a location information collection unit for collecting at least a location information regarding a physical location of a prescribed node connected to the network; and a management unit for managing physical locations of other nodes/services that are connected to the prescribed node, by regarding the other nodes/services as existing at an identical physical location as the physical location of the prescribed node as specified by the location information.

In addition, this communication device may further comprises a display unit for displaying to a user the physical locations of the other nodes/services as identical to the physical location of the prescribed node as specified by the location information.

Moreover, in this communication, the location information collection unit may also collect an information regarding a region corresponding to a leaf of the prescribed node, and the management unit may manage physical location of selected other nodes/services that are connected to the region corresponding to the leaf of the prescribed node alone, by regarding the selected other nodes/services as existing at the identical physical location as the physical location of the prescribed node as specified by the location information.

In this aspect of the present invention, it becomes possible to conjecture that the other nodes/services that are connected to the prescribed node on the network or the other nodes/services that are connected to a region corresponding to a leaf portion of the prescribed node on the network are existing in a vicinity (the same room, for example) of the identified physical location of the prescribed node, so that it becomes possible to display these other nodes/services as existing in a vicinity (the same room, for example) of the identified physical location of the prescribed node, at the display unit with respect to the user. Also, in general, the user of devices at home has a tendency for identifying a device by the correspondence between the location and the device, as in "the VTR in the reception room" or "the refrigerator in the kitchen", and according to the present invention, it becomes possible to provide a network management scheme which is in compliance with this tendency.

According to another aspect of the present invention there is provided a communication device, comprising: at least one communication unit for carrying out communications through a connected network, having communication ports for connecting nodes through which data are to be exchanged by the nodes; a memory for storing a location information regarding a physical location of the communication device; and a reply unit for returning a reply packet containing the location information as stored in the memory, to a node that is a source of a query packet through the communication unit, upon receiving the query packet for inquiring a physical location of the communication device through the communication unit.

In this aspect of the present invention, it becomes possible to reply an information on a physical location of this communication device, such as "reception room", "children's room on the second floor", or "the third floor of the XXX department store at the Shinjuku station", with respect to an entity (a node, for example) which has inquired such an information. Also, by implementing this procedure in a form which is unrelated to the lower layer technologies, it is also possible to realize a location query mechanism that is applicable regardless of the network type.

According to another aspect of the present invention there is provided a communication device, comprising: at least one communication unit to which a single link layer ID is given, for carrying out communications through a connected network, having a plurality of communication ports for connecting nodes through which data are to be exchanged by the nodes; and a network layer processing unit for carrying out a network layer processing related to the communications, by assigning different network layer addresses to the communication ports.

In this aspect of the present invention, even in the case where values of the link layer ID that can be given to the communication devices are to be limited, it is possible to effectively disregard such a limitation as far as network layer addresses are concerned (for example, IPv6 has an address space of 128 bits), so that it becomes possible to provide a network layer processing unit at each communication port and thereby realize an intelligent communication port having various functions such as network layer implementation of the location query protocol, implementation of power consumption query protocol, filtering of passing data, etc.

Also, in this communication device, when a packet destined to the link layer ID given to the communication unit is received from one communication port through the connected network, the network layer processing unit broadcasts at least a part of the packet with respect to other communication ports different from said one communication port if the packet is destined to a network layer address different from one network layer address assigned to said one communication port.

In this case, it becomes possible to deliver a network layer packet that is allocated to some specific communication port to a communication port which properly has that network layer address. This is because it cannot specify the destination communication port of the network layer packet according to the link layer ID alone in this case, but it becomes possible to deliver the network layer packet properly to that network layer processing unit by using the above described broadcast function. Also, by using the broadcast information, it also becomes possible to reduce works, hardware amount and memory amount that are required in preparing the routing table of network layer addresses internally and carrying out the routing.

According to another aspect of the present invention there is provided a network information management method in a communication device having at least one communication unit for carrying out communications through a connected network, the method comprising the steps of: collecting a configuration information of the connected network; collecting at least a location information regarding a physical location of a prescribed node connected to the network; and managing physical locations of other nodes/services that are connected to the prescribed node, by regarding the other nodes/services as existing at an identical physical location as the physical location of the prescribed node as specified by the location information.

According to another aspect of the present invention there is provided a location information notification method in a communication device having at least one communication unit for carrying out communications through a connected network and a memory for storing a location information regarding a physical location of the communication device, the method comprising the steps of: receiving a query packet for inquiring a physical location of the communication device through the communication unit; and returning a reply packet containing the location information as stored in the memory, to a node that is a source of the query packet through the communication unit.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 13, various embodiments of a network node management scheme according to the present invention will be described in detail.

<First Embodiment>

Figure 1:
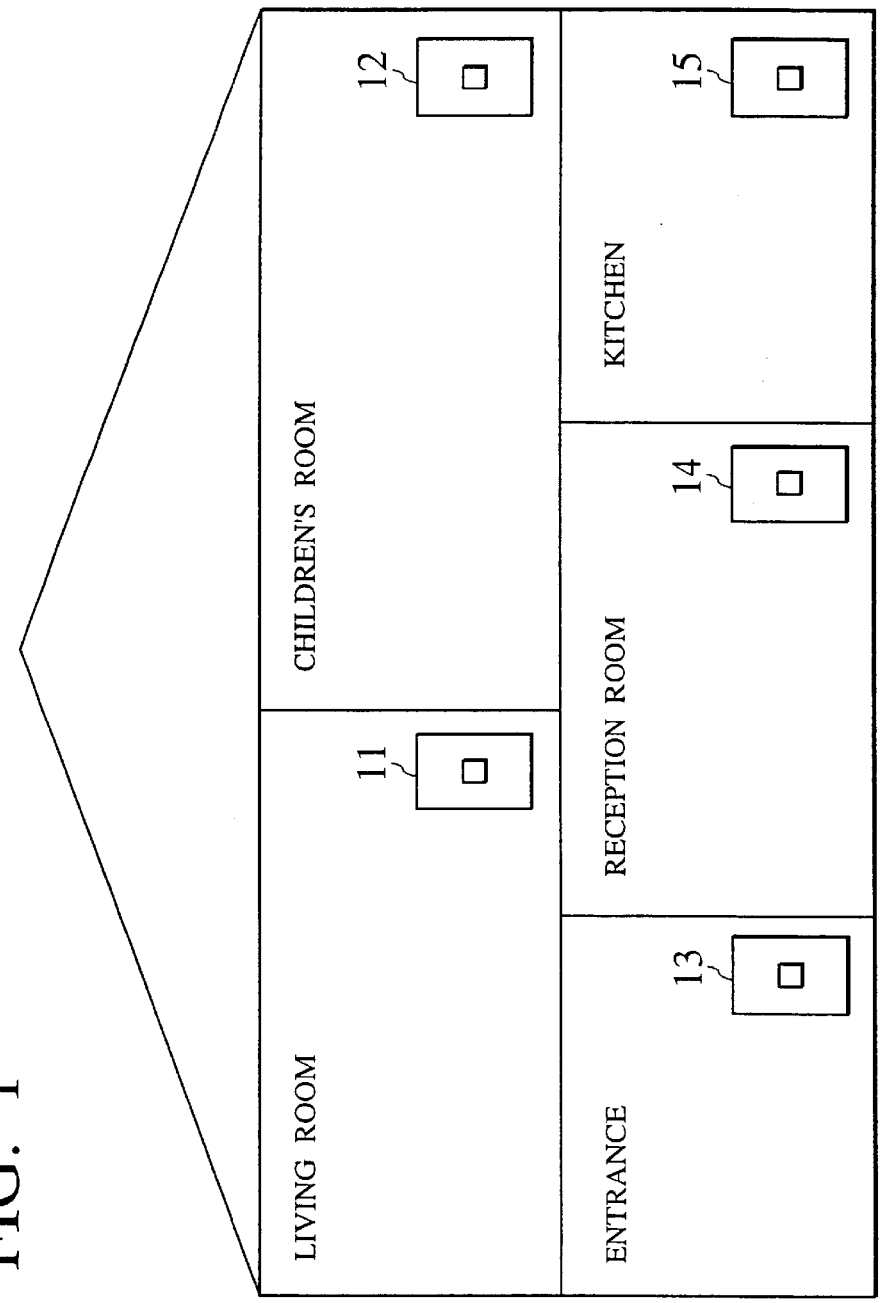
FIG. 1 is a schematic diagram showing an exemplary state of information outlets provided in a home according to the embodiments of the present invention.
Figure 2:
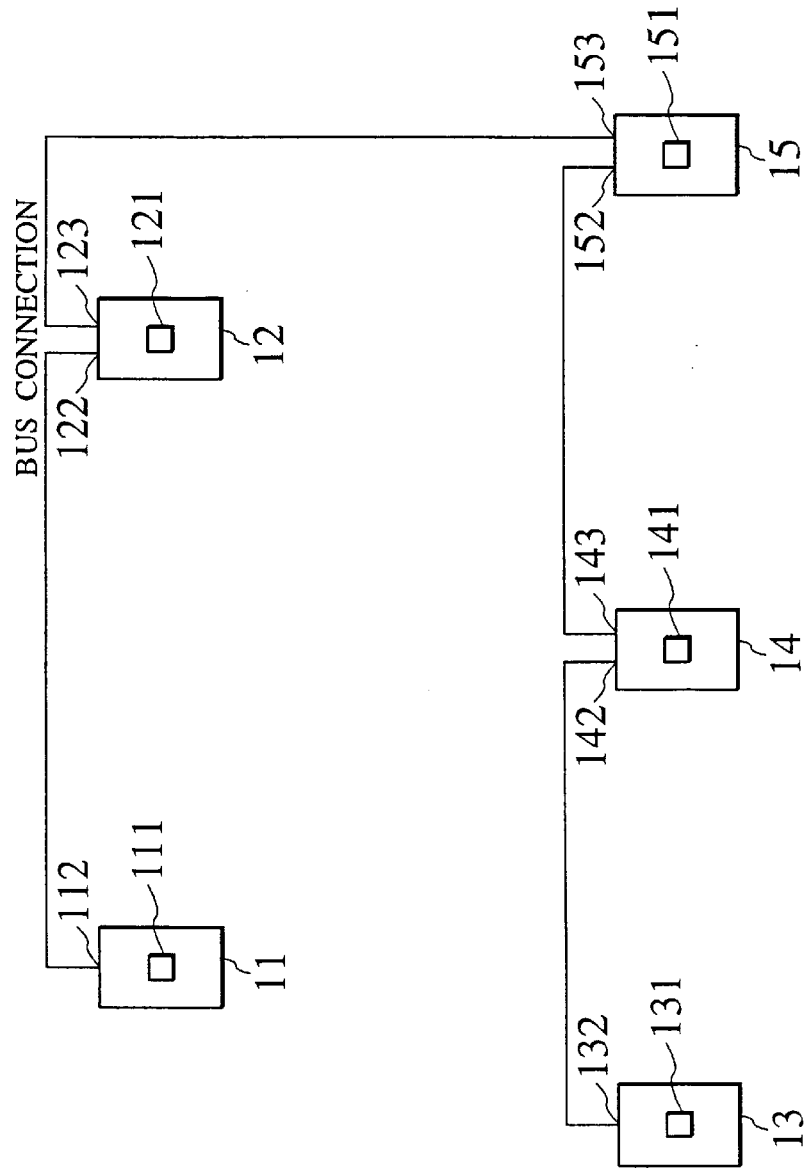
FIG. 2 is a diagram showing an exemplary state of inter-connections among the information outlets shown in FIG. 1.

FIG. 1 shows an exemplary state of information outlets provided in a home. In this example, the IEEE 1394 information outlets 11 to 15 are provided at a living room, a children's room, an entrance, a reception room, and a kitchen of the home respectively. These information outlets 11 to 15 are inter-connected as shown in FIG. 2, for example. Usually, the information outlets 11 to 15 are inter-connected behind the walls of the home.

In this first embodiment, each one of these information outlets 11 to 15 constitutes a single IEEE 1394 node. Namely, each one of these information outlets 11 to 15 has one IEEE 1394 node ID by itself.

A device (node) connected to the information outlet in this embodiment is capable of carrying out data communications with the other nodes through IEEE 1394 bus, and assumed to have a function for controlling other devices (nodes) by the datalink level or upper layer protocol and/or a function for receiving controls from other devices (nodes).

Figure 3:
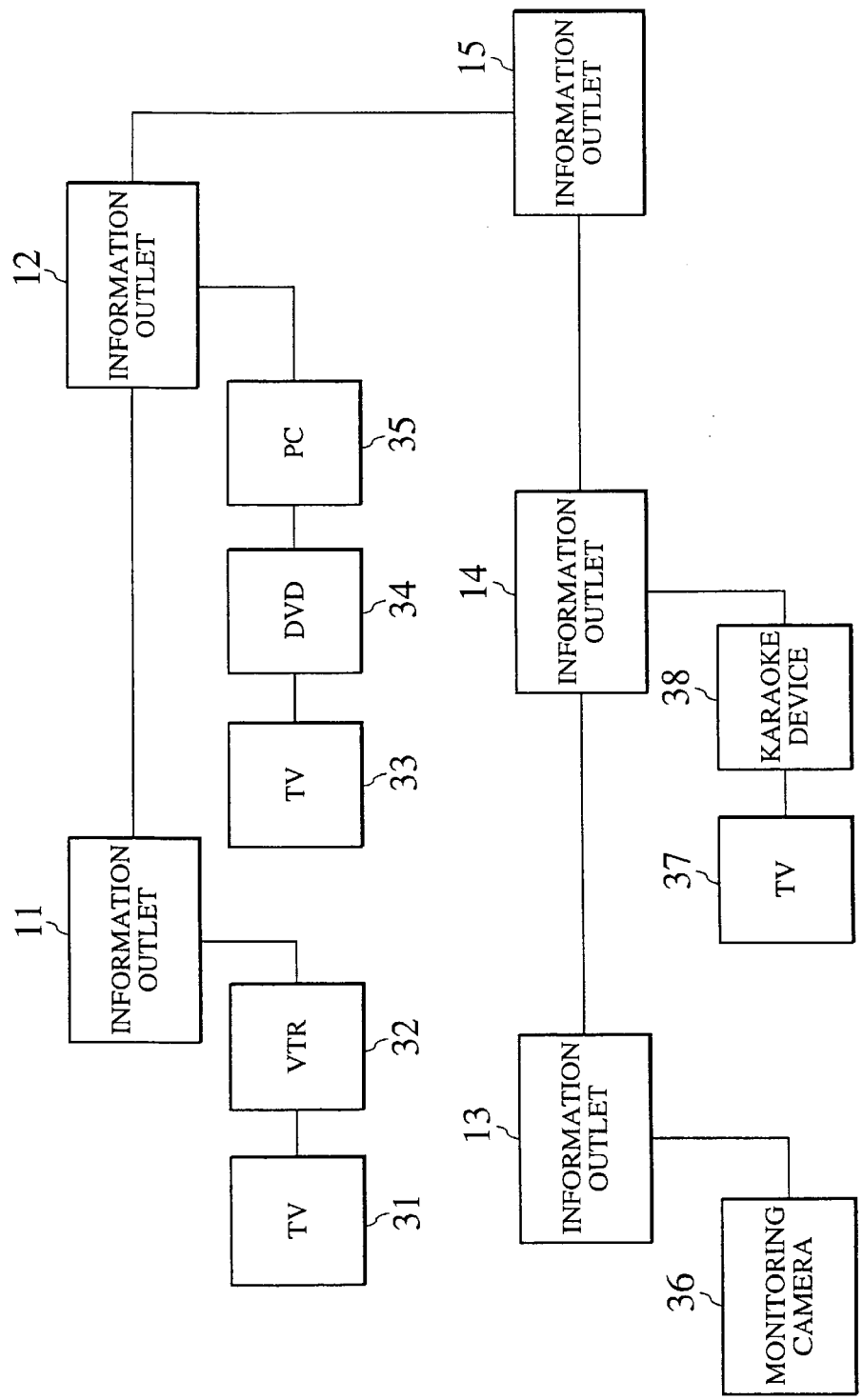
FIG. 3 is a diagram showing an exemplary state of devices connected to the information outlets shown in FIG. 1.

FIG. 3 shows an exemplary state where various devices are connected to the information outlets in the home of this example. Namely, a TV 31 and a VTR 32 are connected to the information outlet 11 of the living room, a TV 33, a DVD 34 and a PC 35 are connected to the information outlet 12 of the children's room, a monitoring camera 36 is connected to the information outlet 13 of the entrance, and a TV 37 and a karaoke device 38 are connected to the information outlet 14 of the reception room, while no device is connected to the information outlet 15 of the kitchen.

This implies that the TV 31 and VTR 32 at the living room, the TV 33, DVD 34 and PC 35 at the children's room, the monitoring camera 36 at the entrance, and the TV 37 and karaoke device 38 at the reception room are connected to respective information outlets, that is, to the IEEE 1394 bus that constitutes the home network, while there is no IEEE 1394 device at the kitchen except for the information outlet 15 itself.

In the exemplary device connection shown in FIG. 3, there are altogether thirteen IEEE 1394 nodes including five information outlets themselves and eight devices on the IEEE 1394 bus of this home.

Note that when the information outlets are connected together through bridges, there are cases where it is necessary to account for the number of bridge devices or the number of ports of the bridge devices in the number of IEEE 1394 nodes.

Now, in the network of the configuration as described above, consider a case of remote controlling the VTR 32 in the living room from the PC 35 in the children's room. Here, the remote control is an operation to make a video recording reservation on the VTR 32 in the living room or to playback a video on the VTR 32 in the living room and display it on the TV 33 in the children's room, for example.

In this case, it is very convenient if a user in the children's room can specify the control target VTR very literally as "VTR in the living room", for example. In general, introduction of the network management/domain name concept of the computer network such as "let's name this VTR vtr.living.takahashi.tokyo.jp" directly to the user should preferably be avoided, although a partial use of such a concept might be possible in some cases.

For this reason, the network management mechanism of this first embodiment recognizes a device connected to some information outlet as being located at the same physical location as that information outlet. For example, "an IEEE 1394 device connected to the information outlet at the living room" is regarded as "existing in the living room". Then, the device connected to the information outlet provided at the living room is presented to the user as "existing in the living room".

To this end, there is a need for a node connected to the network to recognize things like "which information outlet is provided at which room". For this reason, in this first embodiment, a register, i.e., a configuration memory within each 1394 node stores at least information regarding a physical location of the node. A memory position to write this information, i.e., a register address is uniquely set up in advance in the 1394 address space (the identical address is set up for all 1394 nodes). Here, it is preferable to have this address value predetermined by the standardization organization such as IEEE or 1394 TA (Trade Association), for example, so that compatible devices can be produced by manufactures who are adopting such a predetermined value.

Figure 4:
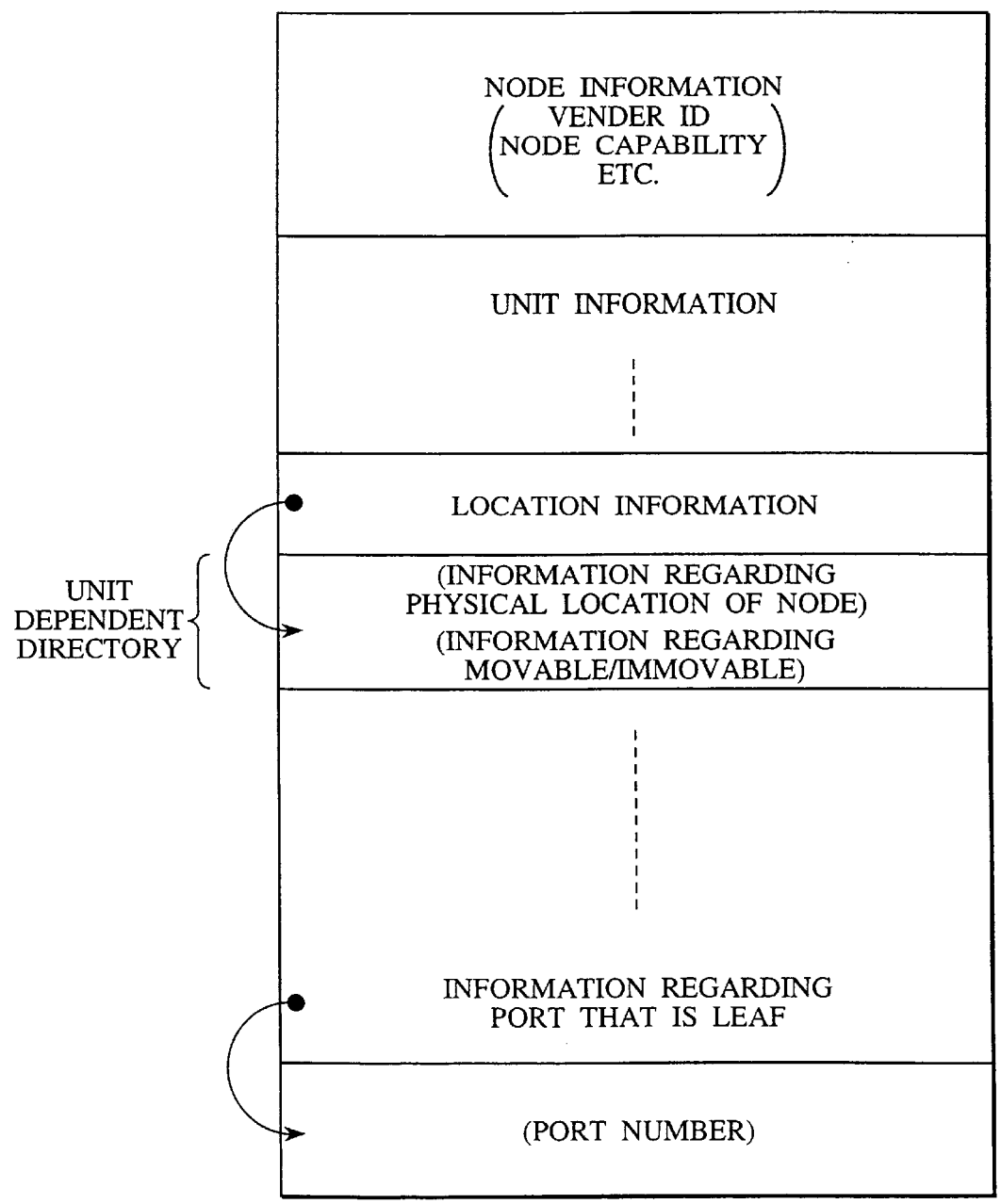
FIG. 4 is a diagram showing an exemplary format of an information to be stored in a configuration memory of each information outlet according to the first embodiment of the present invention.

FIG. 4 shows an example of information to be stored in the configuration memory. In this example, the configuration memory of each 1394 node stores a node information (such as a vender ID, a node capability, an information capable of specifying a type or specification of a device, etc.) which is the basic information regarding that node, as well as an information regarding a physical location of the node which is entered as a location information at a dedicated unit dependent directory for storing the location information that is provided at a predetermined position (offset) of the configuration memory.

As for the content of the information regarding the physical location that is to be stored in this configuration memory, various choices are available.

One choice is to describe the concrete information regarding a location such as "first floor", "second floor", "reception room", "living room", "bed room", "right" and "left" by text using the official language of the intended country of use, Another choice is to describe codes encoding the concrete information regarding a location such as "first floor", "second floor", "reception room", "living room", "bed room", "right" and "left". Note that, as mentioned above, this information should preferably be coded as the international standard by the public organization such as IEEE.

Still another choice is to describe identification numbers uniquely assigned to the information outlets at least within the home, and use a computer to carry out a processing for establishing correspondences between the identification numbers and the concrete information regarding a location such as "first floor", "second floor", "reception room", "living room", "bed room", "right" and "left".

In addition to such an information regarding a location, it is also possible to describe an information regarding whether that node is movable or immovable as a part of the location information. The above described provision to regard a node connected to the information room outlet of the living room as existing in the living room already presupposes that the information outlet is fixedly provided at the living room, so that it is particularly useful for the location information to specify whether that node is movable or immovable, especially in the case of the information outlet.

Also, the IEEE 1394 specifies to attach port numbers to ports of the nodes. For example, in FIG. 2, it is assumed that the information outlet 11 has two ports corresponding to 111 and 112, the information outlet 12 has three ports corresponding to 121, 122 and 123, the information outlet 13 has two ports corresponding to 131 and 132, the information outlet 14 has three ports corresponding to 141, 142 and 143, and the information outlet 15 has three ports corresponding to 151, 152 and 153.

In the 1394 nodes that constitute the information outlets, ports (111, 121, 131, 141 and 151 of FIG. 2) to be exposed outward as the information outlets are always leaves of a tree from a viewpoint of the IEEE 1394 topology. This implies that if a port that is a leaf in the IEEE 1394 tree constituting the home network is detected, and if this node has a fixed physical location (which can be recognized clearly from the above described information indicating that it is immovable), then it can be said that a node connected to that port is (or highly likely to be) existing at the same location as the node that has that port. For example, a node that is connected to a leaf port of a node having the information corresponding to "living room" on its configuration memory (which also has the information indicating that it is immovable) can be regarded as existing in the "living room".

Consequently, it is preferable to describe an information as to which port is a leaf, that is, the port number of a port that is a leaf, as the node attribute information on the configuration memory of each node. In this first embodiment, this information is described on the configuration memory as shown in FIG. 4.

Note here that, instead of describing the information regarding a leaf port, it is also possible to adopt such a scheme that a node that is connected to a node having the information corresponding to "living room" on its configuration memory, and which can be recognized as a node other than the information outlet from the node information on the configuration memory, will be regarded as existing in the "living room", for example.

Assuming that all of the information regarding a physical location, the information regarding movable/immovable and the information regarding a leaf port are to be described, in the configuration memory of the information outlet 11, the information corresponding to the living room as the location information, the information indicating that it is immovable, and the port number (corresponding to 111 of FIG. 2) that is a leaf, will be described.

In general, it appears customary to carry out the registration of such information at a time of construction of the network, but a timing for the registration of such information is not particularly limited in this first embodiment. It also goes without saying that it is preferable to make it possible to carry out the rewriting of such information (rewriting the location information that is initially registered as "room-1" into "children's room", for example).

Now, the above described example of remote controlling the VTR 32 in the living room from the PC 35 in the children's room will be reconsidered.

In the IEEE 1394, it is possible to recognize the IEEE 1394 network topology through the exchange of self ID packets which is the initialization phase of bus/network. In conjunction with this, the PC 35 can recognize that the information outlet 11 exists in the living room so that the TV 31 and VTR 32 that are connected thereto also exist in the living room, by reading the information regarding a physical location on the configuration memory of each node through the IEEE 1394 network. Similarly, the PC 35 can also recognize that the information outlet 12, TV 33, VTR34 and PC 35 exist in the children's room, the information outlet 13 and monitoring camera 36 exist in the entrance, the information outlet 14, TV 37 and karaoke device 38 exist in the reception room, and the information outlet 15 exists in the kitchen.

Note that it is also possible to recognize the device attribute of each node, such as an information that this node is TV or this node is DVD, for example, from the node information described in the configuration memory.

Figure 5:
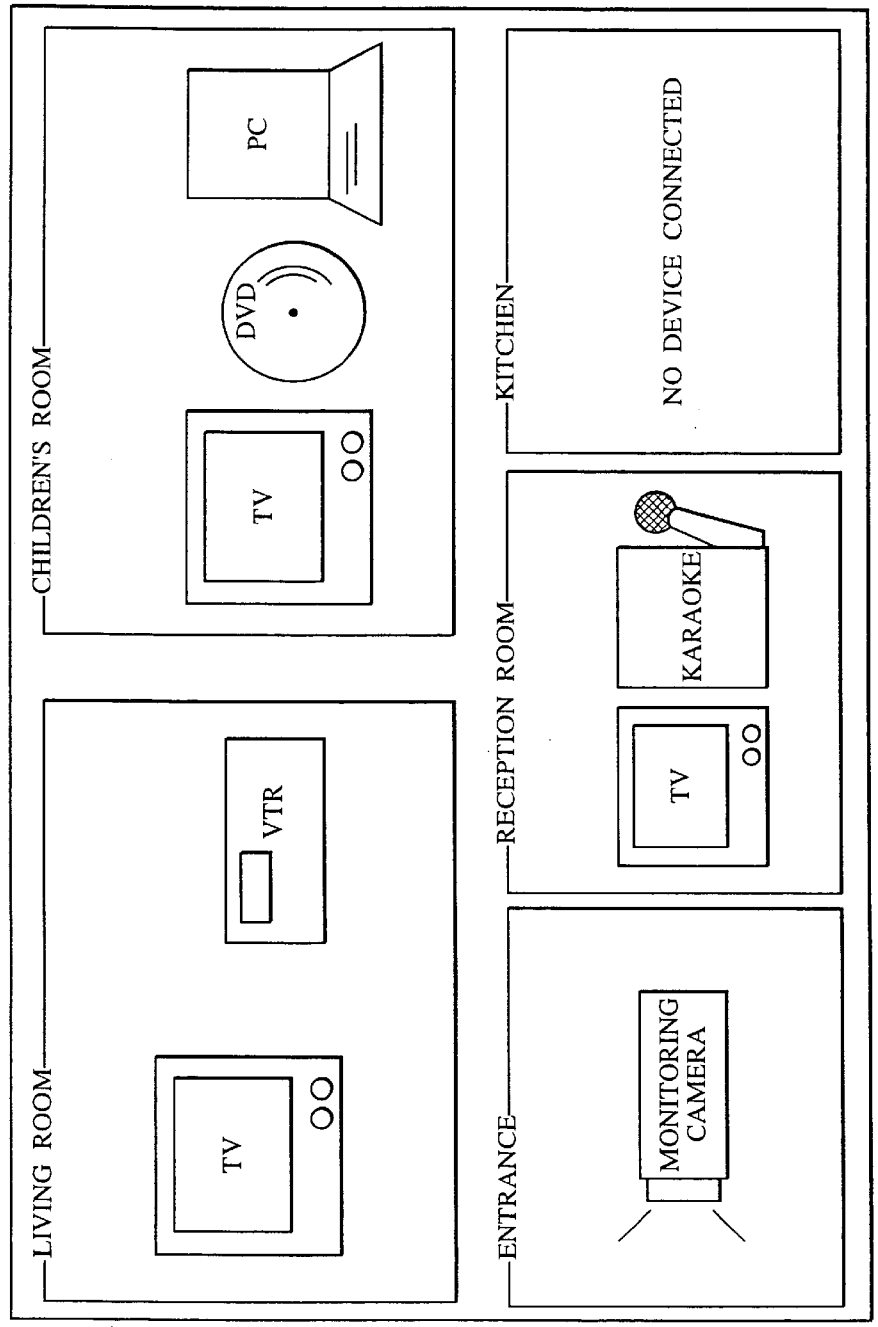
FIG. 5 is a diagram showing an exemplary display screen for displaying an information on a physical location of each device according to the first embodiment of the present invention.

The PC 35 can display on its screen a result of the above described recognition, that is, an information on type and physical location of each device that is obtained by reading and collecting the information regarding a physical location and the information regarding a device attribute on the configuration memory of each node. An exemplary display that can be used here is shown in FIG. 5. The display content of FIG. 5 corresponds to the exemplary device connection of FIG. 3.

From a viewpoint of the user, the interest lies in recognizing control target nodes (the VTR 32 in the living room and the TV 33 in the children's room in this example) on the screen, and not in seeing what is the topology of the IEEE 1394 network or the like, in the case of usual device controlling. For this reason, the display on the screen of the PC 35 in this example is kept to the least necessary information as the graphical user interface (GUI) such as "which device" in "which room". For example, the information outlets themselves are not displayed. This is because it can be expected that the information outlets will not be the control targets of the user normally.

When the information as shown in FIG. 5 is presented by the screen of the PC 35, for example, the user can carry out the remote control of a desired device by selecting an icon of a desired device and carrying out selection/input operation on an input screen that is opened in correspondence to the selected icon, using input devices such as mouse or pen or remote controller and input operations such as clicking, drag-and-drop, etc. For example, on the display screen of the PC 35 as shown in FIG. 5, the VTR 32 in the living room can be remote controlled from the PC 35 in the children's room by carrying out a prescribed operation such as dragging a "VTR" icon in the living room and dropping it at a "TV" icon in the children's room, so that it becomes possible to carry out the remote control to make a video recording reservation on the VTR 32 in the living room from the PC 35 in the children's room, or playback a video on the VTR 32 in the living room and display it on the TV 33 in the children's room.

Note that the remote control utilizing a screen as shown in FIG. 5 and the control and data transfer between devices through 1394 network can be realized by the known techniques so that the detailed description will be omitted here.

It is also possible to present what service is provided at which room by describing a service provided by each node in the configuration memory of each node.

As described, according to this first embodiment, it becomes possible to realize the management of physical locations of nodes or service providing based on this management, which has been impossible conventionally, by providing a region for describing a location information in the configuration memory of each node.

<Second Embodiment>

The basic configuration used in this second embodiment is the same as in the first embodiment, and the same concrete example as used in the first embodiment will also be used for explanation, so that the differences from the first embodiment and the characteristic features of this second embodiment will be mainly described in the following.

In this second embodiment, the information outlet provided at each room is assumed to be an IP node, i.e., a node capable of carrying out communications using the Internet protocol. Namely, the information outlet is going to have computer resources (such as CPU, dedicated IP processing chip, etc.) necessary for the operation as an IP node.

Then, it is also assumed that there is an Internet application for presenting which devices are connected at each room, and providing a GUI environment in which commands for controlling each device can be received and commanded controls can be executed.

In this way, it is possible to realize the home network management or the management application creation which is not dependent on the link layer technologies such as IEEE 1394 or home automation, which is applicable regardless of a network type, and which is encompassing a plurality of networks (types).

This second embodiment also assumes a situation where the information outlets are provided in the home as shown in FIG. 1. Namely, the IEEE 1394 information outlets 11 to 15 are provided at a living room, a children's room, an entrance, a reception room, and a kitchen of the home respectively, and these information outlets 11 to 15 are inter-connected as shown in FIG. 2. Here, however, unlike the first embodiment, it is not assumed that the information regarding a physical location is described in advance in the configuration memory of each information outlet. The devices connected to these information outlets 11 to 15 are the same as those shown in FIG. 3.

Now, the case of remote controlling the VTR 32 in the living room from the PC 35 in the children's room will be considered again. In this case, the network management program operated at the PC 35 in the children's room activates a protocol aimed for inquiring a location, and carries out the operation to inquire each node connected to the network about a location of that node. An exemplary procedure for this operation is shown in FIG. 6.

First, at a time of activation of the IEEE 1394 network, the PC 35 can recognize its topology, that is, what devices are connected at which parts of the connected IEEE 1394 bus, through the self ID packet exchange and the configuration memory reading. However, here it is only possible to recognize up to the topology, and it is not possible to recognize a physical location information as to what devices are located in which room.

Figure 6:
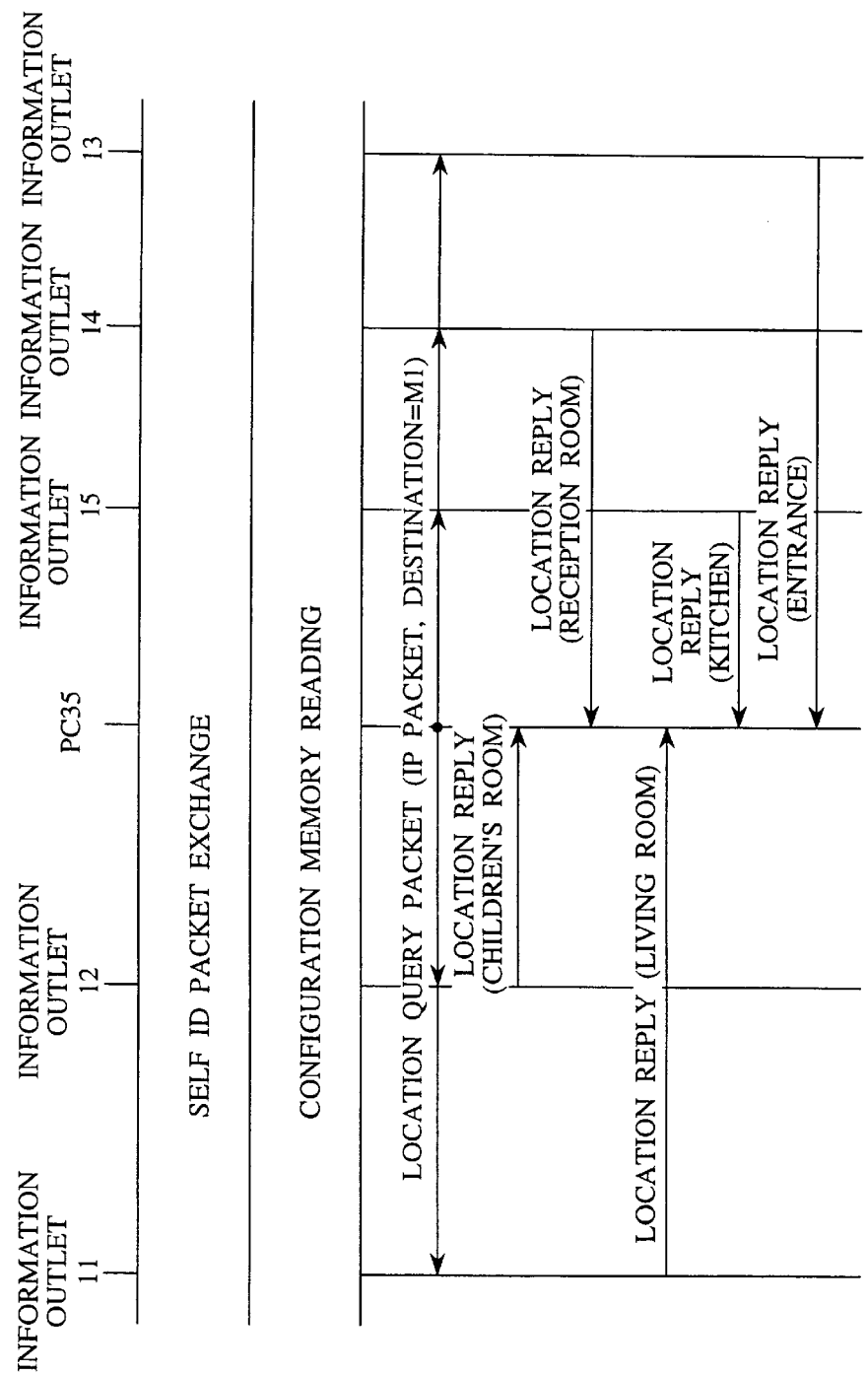
FIG. 6 is a sequence chart for a procedure to inquire a location information to each node according to the second embodiment of the present invention.

Consequently, the PC 35 transmits a location query packet onto the IEEE 1394 as shown in FIG. 6. This packet is an IP packet to be transmitted to an IP multicast address that is allocated to the location query protocol in advance. Here, this IP multicast address is assumed to be M1.

Figure 7:
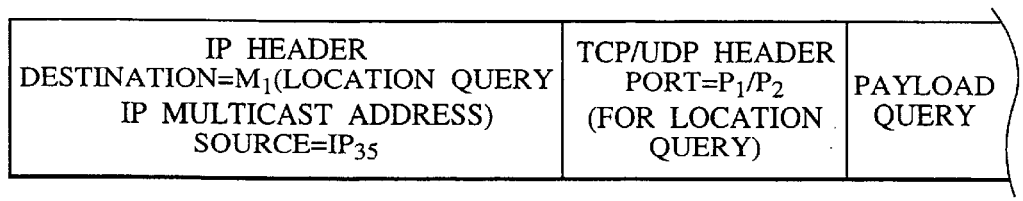
FIG. 7 is a diagram showing an exemplary packet format for a location query packet used in the procedure of FIG. 6.

FIG. 7 shows an exemplary packet format for this location query packet. As shown in FIG. 7, this location query packet is transmitted to a location query IP multicast address, and outputted to a port number (TCP or UDP port number) allocated in advance to the location query protocol. The payload contains an information indicating that this is a packet for query and the like.

Now, the information outlets 11 to 15 are set up in advance to receive this location query packet, that is, to receive an IP packet destined to the location query IP multicast address. In addition, it is assumed that each information outlet also has the information regarding its own physical location and the like internally as the configuration information by some method in advance. This information may have been described in a ROM from the beginning or may be described in a RAM later on, and the method of description here is assumed to be the same as that for describing the location information and the like into the IEEE 1394 configuration memory in the first embodiment.

Now, taking the information outlet 12 as an example, the information outlet 12 that received the above described location query packet recognizes that this is the location query packet from the port number and the payload, and transmits a reply packet (location reply packet) from each node describing the information regarding a physical location and the like, to the PC 35 which is a source of the query, after an elapse of a random time period since the receiving. Here, the reply packet is transmitted after a random time period in order to prevent concentration of reply packet transmissions from a plurality of information outlets to the PC 35 into the same time period.

Figure 8:
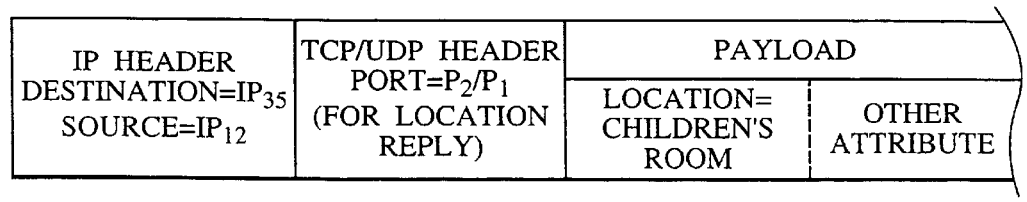
FIG. 8 is a diagram showing an exemplary packet format for a location reply packet used in the procedure of FIG. 6.

FIG. 8 shows an exemplary packet format for the location reply packet. As shown in FIG. 8, this location reply packet is transmitted to an address which is a source of the location query packet (that is the IP35 which is the IP address of the PC 35). A port number (TCP or UDP port number) allocated in advance to the location query protocol is also attached similarly as in the location query packet (although the port number is to be reversed in the case of transmission and in the case of reception). The payload describes an information indicating that this packet is a packet for reply and that device (the information outlet 12 in this case) is located at the children's room, along with the attribute information (the information indicating whether that information outlet is movable or immovable, the information indicating a leaf port number, etc.).

In this way, the network management program of the PC 35 can obtain the information regarding physical locations of the information outlets 11 to 15, and by combining this information with the topology information recognized earlier through the self ID packet exchange and the configuration memory reading, it becomes possible to recognize (conjecture) a location at which each node exists.

Figure 9:
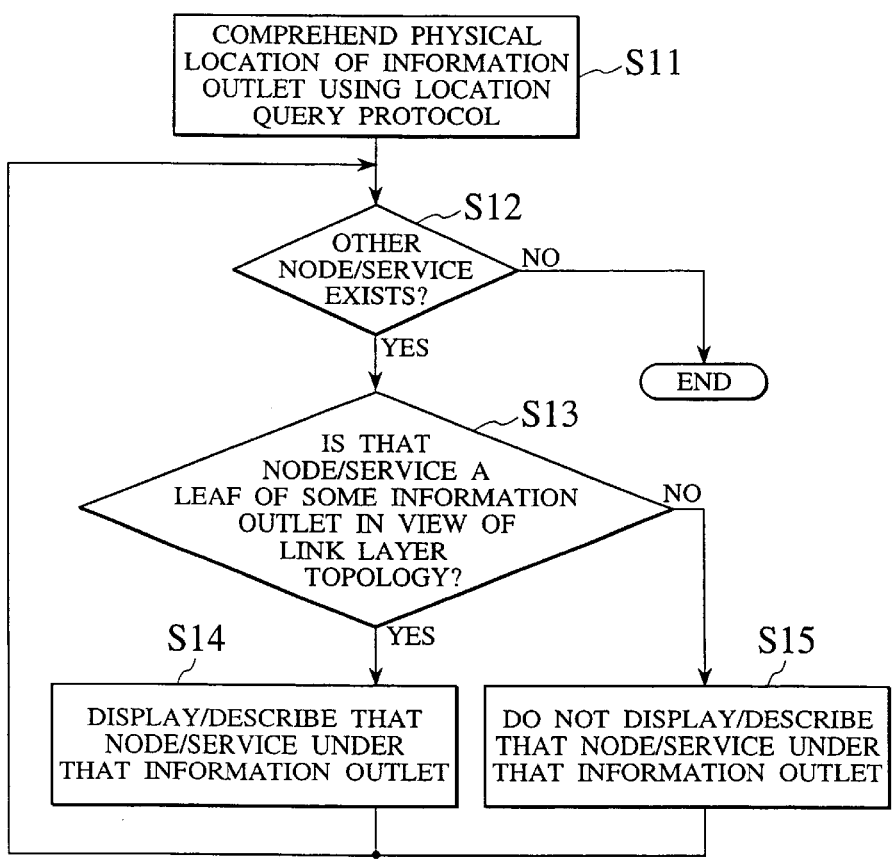
FIG. 9 is a flow chart for an operation of a network management program which is an IP application according to the second embodiment of the present invention.

FIG. 9 shows an exemplary operation procedure for the network management program in a form of an IP application. Namely, first, a physical location of each information outlet is comprehended using the location query protocol, that is, which information outlet is located at which room is recognized (step S11). Then, for each information outlet, an information outlet under which a node connected to its leaf is existing or the fact that no node is connected to its leaf is sequentially recognized. That is, for each node or service that exists (step S12), whether that node or service is a leaf of some information outlet in view of the link layer topology or not is judged (step S13), and if so, that node or service is displayed or described under that information outlet (step S14) whereas if not, that node or service is not displayed or described under that information output (step S15). In other words, the network management program in a form of an IP application regards a node that is connected to a leaf of the information outlet as existing in a room that is indicated by the location information and the like of that information outlet, and displays to the user a relationship between the rooms and the physical locations of the nodes, on a screen as shown in FIG. 5 through GUI similar to that of the first embodiment.

The subsequent operations by the user and the corresponding operations of the devices are the same as in the first embodiment.

Note that, in this second embodiment, the case of using the location query protocol has been described, but it is also possible to realize the same mechanism as the above, by providing a tag (such as <loc>, </loc>, etc.) that indicates the location information and the like using HTTP, and exchanging this tag, for example.

Also, as for the registration of the location information and the like, it is possible to use a method in which the information is stored in advance in a MIB (Management Information Base) and the registration is realized by reading this information, or a method for notifying the location information and the like at a time of notifying the service using the service location protocol (see IETF RFC 2165 for detail).

It is also possible to use these methods for notifying or acquiring the location information and the like in combination with the display method according to the mechanism described above.

Also, by implementing this procedure in a form which is unrelated to the lower layer technology, it is also possible to realize a location query mechanism that is applicable regardless of the network type.

<Third Embodiment>

The basic configuration used in this third embodiment is the same as in the first embodiment, and the same concrete example as used in the first embodiment will also be used for explanation, so that the differences from the first embodiment and the characteristic features of this third embodiment will be mainly described in the following.

Figure 10:
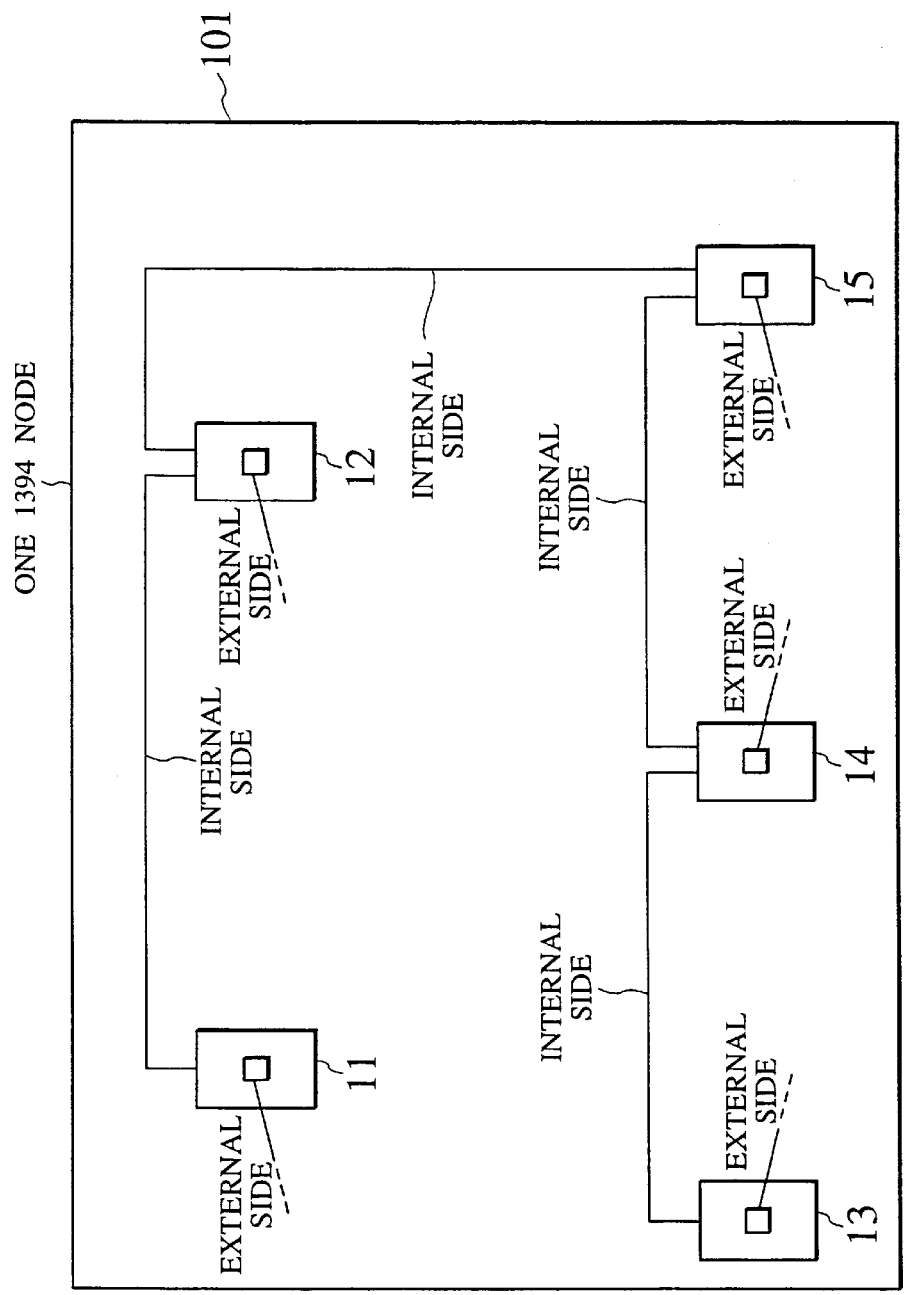
FIG. 10 is a diagram showing an information outlet group node according to the third embodiment of the present invention.

This third embodiment also assumes a situation where the information outlets are provided in the home as shown in FIG. 1. The difference from the first and second embodiments is that, in contrast to the first and second embodiments where each information outlet was a single IEEE 1394 node by itself, all (or a partial set) of the information outlets that are provided throughout the home will constitute a single IEEE 1394 node 101 as shown in FIG. 10 in this third embodiment. Namely, it is a situation where it can be regarded that all these information outlets 11 to 15 have the same IEEE 1394 node ID, and only the physical locations of these 1394 connectors are physically separated more than usual. Here, actual locations of the entities such as CSR (Command Status Register), bus manager, etc., of the IEEE 1394 in the configuration of FIG. 10 are not particularly limited.

Similarly as in the first embodiment, various devices are connected to the information outlets 11 to 15 of this home. Here, the devices connected to these information outlets 11 to 15 are assumed to be the same as those shown in FIG. 3. Namely, a TV 31 and a VTR 32 are connected to the information outlet 11 of the living room, a TV 33, a DVD 34 and a PC 35 are connected to the information outlet 12 of the children's room, a monitoring camera 36 is connected to the information outlet 13 of the entrance, and a TV 37 and a karaoke device 38 are connected to the information outlet 14 of the reception room, while no device is connected to the information outlet 15 of the kitchen.

Figure 11:
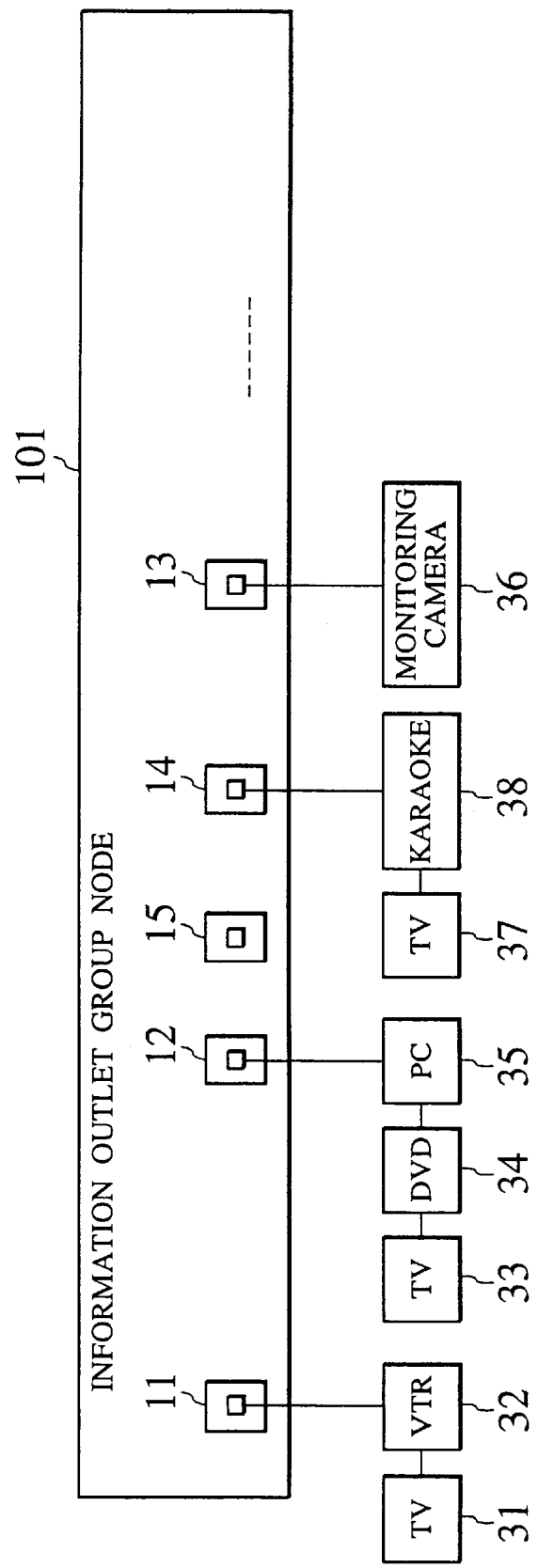
FIG. 11 is a diagram showing a topology of the information outlet group node according to the third embodiment of the present invention.

However, their topology from a viewpoint of the network is different from the first and second embodiments, and the information outlets 11 to 15 as a whole are regarded as a single IEEE 1394 node 101 as shown in FIG. 11. Consequently, in this case, it appears as if there are nine IEEE 1394 nodes in this home. Here, such a node like 101 that contains a plurality of information outlets will be referred to as "information outlet group node".

Now, similarly as in the first and second embodiments, the network management mechanism of this third embodiment regards a 1394 device connected to the information outlet of the living room exists in the living room. Namely, a device connected to the information outlet of the living room will be presented to the user in such a form that it exists in the living room. To this end, it is also necessary here to make it possible for a node connected to the network to recognize the relationship between the information outlets and their physical locations.

For this reason, in this third embodiment, an information regarding each information outlet is provided in the configuration memory of the information outlet group node 101. A memory position, i.e., a register address for storing this information is uniquely set up in advance in the 1394 address space (the identical address is set up for all the information outlet group nodes).

Figure 12:
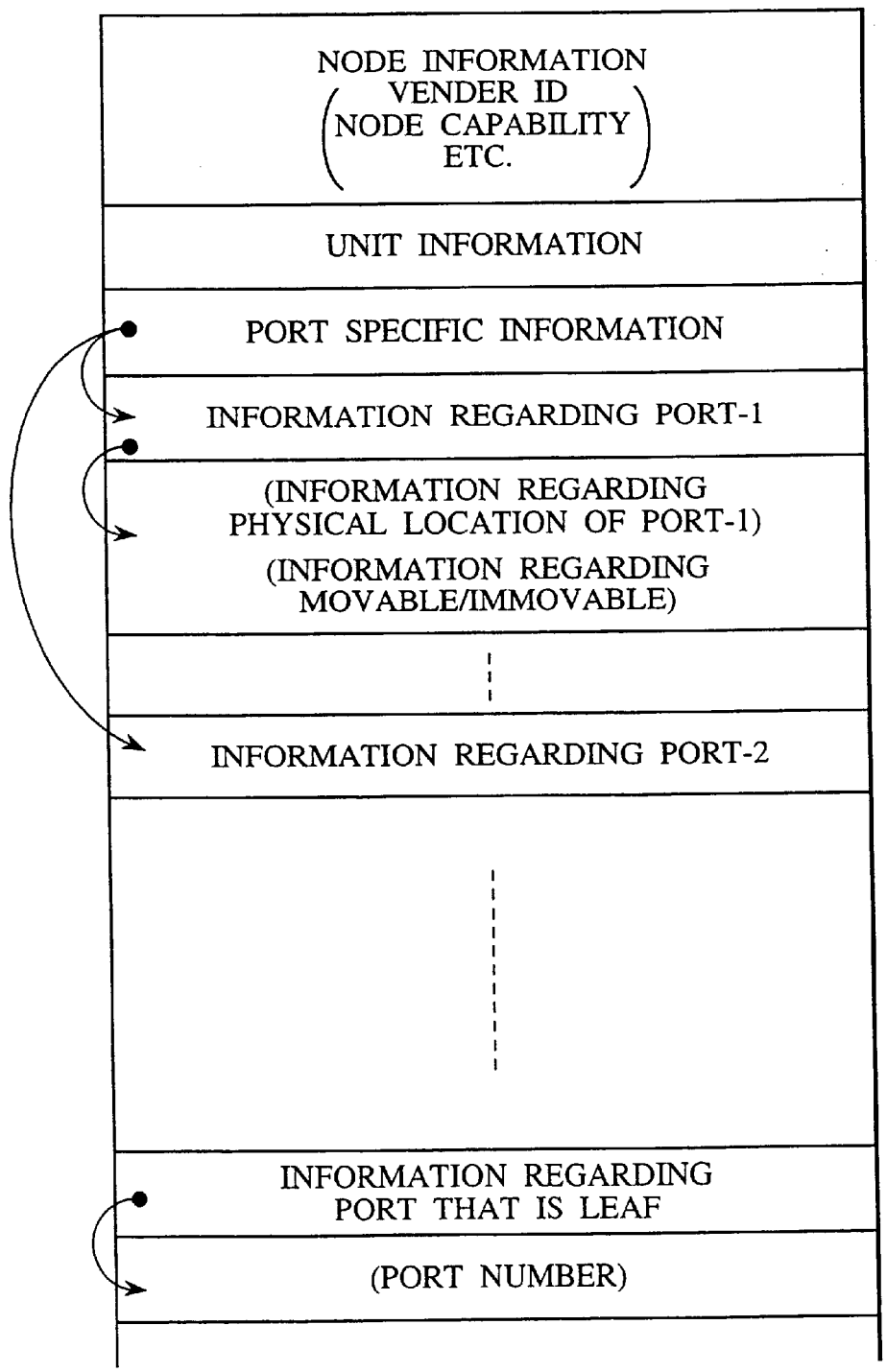
FIG. 12 is a diagram showing an exemplary format of an information to be stored in a configuration memory of the information outlet group node according to the third embodiment of the present invention.

FIG. 12 shows an example of information to be stored in the configuration memory in this third embodiment. In this example, a dedicated unit dependent directory for storing the information regarding each information outlet (also referred hereafter as "port" in this embodiment) is provided at a predetermined position (offset) of the configuration memory of the information outlet group node 101, and as its unit dependent directory, a dedicated unit dependent directory for storing the location information of that unit (the port, i.e., the information outlet) is also provided and the location information of that port is stored therein.

More specifically, as shown in FIG. 12 for example, the port specific (information outlet specific) information is stored as a sub-directory, and the location information (the information regarding a physical location, the information regarding movable/immovable), the information indicating a port that is a leaf, etc., similar to those of the first embodiment are stored as its further sub-directory, at the predetermined positions in the configuration memory. The purpose and method for using these information are the same as in the first and second embodiments.

Similarly as in the first embodiment, in general, it appears customary to carry out the registration of such information at a time of construction of the network, but a timing for the registration of such information is not particularly limited in this third embodiment.

In the IEEE 1394, it is possible to recognize the IEEE 1394 network topology through the exchange of self ID packets which is the initialization phase of bus/network. This recognition of the topology includes the recognition as to which IEEE 1394 nodes are connected to which ports of the information outlet group node.

When the PC 35 is assumed to be collecting the location information and the like, in conjunction with the self ID packet exchange phase, the PC 35 can recognize that the information outlet 11, TV 31 and VTR 32 exist in the living room, the information outlet 12, TV 33, VTR 34 and PC 35 exist in the children's room, the information outlet 13 and monitoring camera 36 exist in the entrance, the information outlet 14, TV 37 and karaoke device 38 exist in the reception room, and the information outlet 15 exists in the kitchen, by reading the information regarding a physical location on the configuration memory as shown in FIG. 12. Note that, as already mentioned above, things like that this node is TV or this node is DVD, for example, are recognized from the information described in the configuration memory of each node.

The display of the above recognition result on a screen at the PC 35 can be realized by the display method shown in FIG. 5 as in the first and second embodiments, for example. The subsequent controls of devices can also be realized similarly as in the first and second embodiments.

<Fourth Embodiment>

The basic configuration used in this fourth embodiment is the same as in the third embodiment, and the same concrete example as used in the third embodiment will also be used for explanation, so that the differences from the third embodiment and the characteristic features of this fourth embodiment will be mainly described in the following.

This fourth embodiment also assumes a situation where the information outlets are provided in the home as shown in FIG. 1. Similarly as in the third embodiment, all (or a partial set) of the information outlets that are provided throughout the home will constitute a single IEEE 1394 node, the information outlet group node 101, as shown in FIG. 13 in this fourth embodiment.

The difference from the third embodiment is that each of these ports, that is, each of the information outlets 11 to 15, has its own IP address. Namely, it is a situation where the information outlet group node 101 is a single IEEE 1394 node from a viewpoint of IEEE 1394, but its ports (information outlets) are allocated with different IP addresses as IP nodes from a viewpoint of IP. Here, the IP addresses to be given can be either those of IPv4 or those of IPv6. For a host ID portion in the IP address, a combination of the port number value and the EUI 64 (Extended Unique ID) value of the IEEE 1394 or its part can be used for example.

Figure 13:
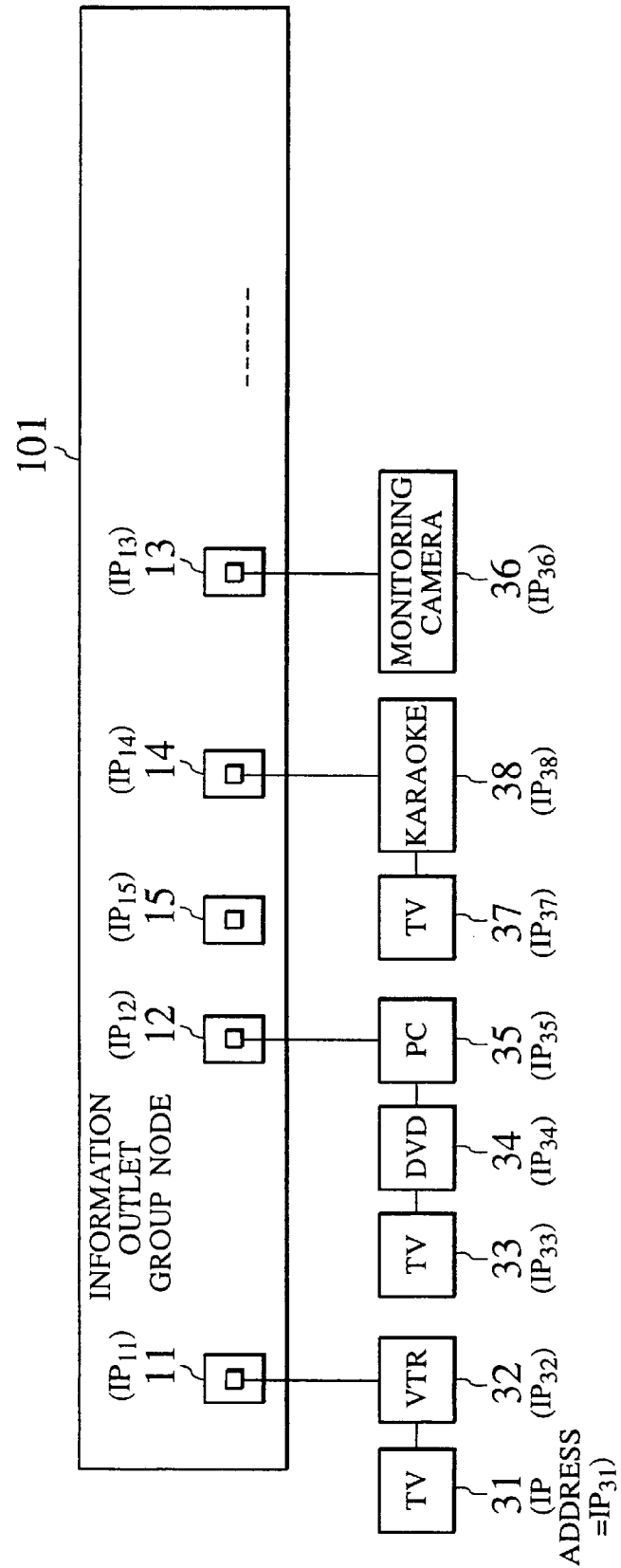
FIG. 13 is a diagram showing an information outlet group node according to the fourth embodiment of the present invention.

As shown in FIG. 13, the IP addresses of the nodes are assumed to be $IP_{11}$ to $IP_{15}$ for the information outlets 11 to 15, and $IP_{31}$, to $IP_{38}$ for the TV 31 to the karaoke device 38, respectively.

In this fourth embodiment, similarly as in the second embodiment, it is assumed that there is an Internet application for presenting which devices are connected at each room, and providing a GUI environment in which commands for controlling each device can be received and commanded controls can be executed, under a situation where the information outlet provided at each room is assumed to be an IP node, i.e., a node capable of carrying out communications using the Internet protocol. Because of the use of IP, it is possible to realize the home network management or the management application creation which is not dependent on the link layer technologies such as IEEE 1394 or home automation and which is applicable regardless of a network type.

Also, in this fourth embodiment, similarly as in the second embodiment, it is not assumed that the information regarding a physical location is described in advance in the configuration memory of each information outlet.

Now, the case of remote controlling the VTR 32 in the living room from the PC 35 in the children's room will be considered here once again. In this case, the network management program operated at the PC 35 in the children's room activates a protocol aimed for inquiring a location, and carries out the operation to inquire each node connected to the network about a location of that node. This protocol is basically the same as in the second embodiment.

Namely, by the procedure shown in FIG. 6, first, the PC 35 can recognize the topology of the IEEE 1394 network, that is, what devices are connected at which parts of the connected IEEE 1394 bus, through the self ID packet exchange and the configuration memory reading. Here, however, similarly as in the second embodiment, it is only possible to recognize up to the topology, and it is not possible to recognize a physical location information as to what devices are located in which room.

Consequently, the PC 35 transmits a location query packet onto the IEEE 1394 as shown in FIG. 6, similarly as in the second embodiment. This packet is an IP packet to be transmitted to an IP multicast address that is allocated to the location query protocol in advance. Here, this IP multicast address is assumed to be M1.

Similarly as in the second embodiment, this location query packet has a packet format as shown in FIG. 7. At each of the information outlets 11 to 15, the location query protocol is activated in advance and the set up to always receive a packet destined to this location query IP multicast address M1 is made in advance.

In addition, it is assumed that each information outlet also has the information regarding its own physical location and the like internally as the configuration information by some method in advance. This information may have been described in an internal ROM from the beginning or may be described in a RAM later on, and the method of description here is assumed to be the same as that for describing the location information into the IEEE 1394 configuration memory in the first embodiment.

Now, taking the information outlet 12 as an example, the information outlet 12 that received the above described location query packet recognizes that this is the location query packet from the port number and the payload, and transmits a reply packet (location reply packet) describing the information regarding a physical location and the like, to the PC 35 which is a source of the query, after an elapse of a random time period since the receiving time. For this information regarding a physical location, the information written in the internal ROM or RAM mentioned above can be used, for example. To this end, a program for transmitting this location reply packet is set such that it recognizes the information regarding its own physical location and the like in advance, prior to transmission of the location reply packet.

The location reply packet has a packet format as shown in FIG. 8. The payload describes an information indicating that this packet is a packet for reply and that device (the information outlet 12 in this case) is located at the children's room, along with the attribute information (the information indicating whether that information outlet is movable or immovable, the information indicating a leaf port number, etc.).

In this way, the network management program of the PC 35 can obtain the information regarding physical locations of the information outlets 11 to 15, and by combining this information with the topology information recognized earlier through the self ID packet exchange and the configuration memory reading, it becomes possible to recognize (conjecture) a location at which each node exists.

More specifically, similarly as in the second embodiment, according to the procedure shown in FIG. 9, a physical location of each information outlet is comprehended using the location query protocol, that is, which information outlet is located at which room is recognized, and then, for each information outlet, an information outlet under which a node connected to its leaf is existing or the fact that no node is connected to its leaf is sequentially recognized. In other words, the network management program in a form of an IP application regards a node that is connected to a leaf of the information outlet as existing in a room that is indicated by the location information and the like of that information outlet, and displays to the user a relationship between the rooms and the physical locations of the nodes, on a screen as shown in FIG. 5 through GUI similar to that of the first embodiment.

The subsequent operations by the user and the corresponding operations of the devices are the same as in the first embodiment.

Now, the information outlet group node 101 has only one link layer address but there are plural IP addresses corresponding to the ports, so that there is a need to provide some programs for dealing with this situation.

First, when one information outlet belonging to the information outlet group node 101 receives the IEEE 1394 packet, there are cases where the destination 1394 node ID is the node ID of the information outlet group node 101 and the destination IP address of the encapsulated internal IP packet is the IP address of another port different from itself.

In this case, the IP processing function of each port carries out the broadcast with respect to the internal wiring sides (internal sides of FIG. 10) of the information outlet group node 101. Namely, that IP packet is forwarded such that it reaches to all the information outlets in that information outlet group node 101.

In this way, even in the case where values of the link layer ID that can be given to the nodes are to be limited, it is possible to effectively disregard such a limitation as far as IP addresses are concerned (for example, IPv6 has an address space of 128 bits), so that it becomes possible to provide an IP processing unit at each port and thereby realize an intelligent port, i.e., an intelligent information outlet having various functions such as network layer implementation of the location query protocol, implementation of power consumption query protocol, filtering of passing data, etc.

In addition, it becomes possible to deliver an IP packet that is allocated to some specific port to a communication port which properly has that IP address. This is because it cannot specify the destination port of the IP packet according to the link layer ID alone in this case, but it becomes possible to deliver the IP packet properly to that IP processing unit by using the above described broadcast function. Also, by using the broadcast information, it also becomes possible to reduce works, hardware amount and memory amount that are required in preparing the routing table of IP addresses internally and carrying out the routing.

Note that each port (information outlet) that received a packet is made not to forward that packet even if its destination IP address is not that node itself, if that packet was received from the internal side. This provision is necessary in order to prevent an indefinite loop in the above described procedure.

Next, a method for handling the case of receiving the inverse ARP (Address Resolution Protocol) will be described. Here, the IP processing unit of each information outlet that received the inverse ARP handles it by replying the own IP address. For example, when the inverse ARP arrives with respect to the information outlet 11, the IP processing unit of the information outlet 11 will return its own IP address, that is $IP_{11}$, as a reply.

As described, according to the present invention, it becomes possible to realize the management of physical locations of communication devices and the service providing based on this management, which have been impossible conventionally, by providing a region for describing an information regarding a physical location in the configuration memory of each communication device.

Note that the embodiments described above are directed to the case where management targets or operation targets are devices, and the processing regarding each device and its physical location, the GUI or remote control service providing based on that, etc., have been described, but it is also possible to deal with the case where management targets or operation targets are services and the processing regarding each service and its physical location or a location where it is provided (a physical location of a node for providing that service) is carried out similarly. For example, when a PC is connected to the information outlet in the reception room, and this PC provides a certain service A (e.g. Web server), it is possible to realize a configuration where this service A is displayed at the reception room portion on the display screen similar to that of FIG. 5 on the PC 35 in the children's room, and this service A can be received at the PC 35 in the children's room by selecting the service A on the screen using a mouse.

Also, the above description presupposes the use of IEEE 1394 for the home network, but the present invention is equally applicable to the other network techniques such as Ethernet, USB (Universal Serial Bus), and controlled LAN such as power line LAN.

Also, each function described above can be realized as software, and it is also possible to realize a computer readable medium that records a program for causing a computer to execute each procedure of means described above.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication device, comprising:
configuration information collection means for collecting a configuration information of a connected network;
location information collection means for collecting at least a location information regarding a physical location of a prescribed node connected to the network; and
management means for managing physical locations of other nodes/services that are connected to the prescribed node, by regarding the other nodes/services as existing at an identical physical location as the physical location of the prescribed node as specified by the location information.

2. The device of claim 1, further comprising:
display means for displaying to a user the physical locations of the other nodes/services as identical to the physical location of the prescribed nodes as specified by the location information.

3. The device of claim 1, wherein the location information collection means also collects an information regarding a region corresponding to a leaf of the prescribed node, and
the management means manages physical location of selected other nodes/services that are connected to the region corresponding to the leaf of the prescribed node alone, by regarding the selected other nodes/services as existing at the identical physical location as the physical location of the prescribed node as specified by the location information.

* * * * *